(12) United States Patent
Xue et al.

(10) Patent No.: US 8,789,435 B2
(45) Date of Patent: Jul. 29, 2014

(54) CAM SELF-ADAPTIVE AUTOMATIC SPEED SHIFT HUB

(75) Inventors: Rongsheng Xue, Chongqinq (CN); Yupei Lin, Chongqing (CN); Yunzhi Hao, Chongqing (CN)

(73) Assignee: Southwest University, Chongqing (CN)

( * ) Notice: Subject to any disclaimer, the term of this patent is extended or adjusted under 35 U.S.C. 154(b) by 1185 days.

(21) Appl. No.: 12/863,951

(22) PCT Filed: Aug. 29, 2008

(86) PCT No.: PCT/CN2008/001553
§ 371 (c)(1),
(2), (4) Date: Jul. 21, 2010

(87) PCT Pub. No.: WO2009/030115
PCT Pub. Date: Mar. 12, 2009

(65) Prior Publication Data
US 2011/0015030 A1    Jan. 20, 2011

(30) Foreign Application Priority Data

| Aug. 31, 2007 | (CN) | 2007 1 0092651 |
|---|---|---|
| Dec. 13, 2007 | (CN) | 2007 1 0093128 |
| Mar. 3, 2008 | (CN) | 2008 1 0069421 |
| Mar. 3, 2008 | (CN) | 2008 1 0069422 |
| Jun. 18, 2008 | (CN) | 2008 1 0069844 |
| Jun. 18, 2008 | (CN) | 2008 1 0069845 |
| Jul. 1, 2008 | (CN) | 2008 1 0069915 |

(51) Int. Cl.
*B62M 11/00* (2006.01)

(52) U.S. Cl.
USPC ............ 74/337; 180/65.7; 180/339; 180/364; 180/370; 192/217.4

(58) Field of Classification Search
USPC ............. 74/377, 337; 180/65.6, 206.5, 206.6, 180/338, 370, 65.7, 339, 364; 192/217.4
See application file for complete search history.

(56) References Cited

U.S. PATENT DOCUMENTS 2,609,712 A * 9/1952 Hood ............................ 475/300
2,747,708 A * 5/1956 Peterson ..................... 192/217.4
(Continued)

FOREIGN PATENT DOCUMENTS

| CN | 2761504 | 3/2006 |
|---|---|---|
| CN | 2774905 | 4/2006 |

(Continued)

OTHER PUBLICATIONS

International Search Report for international application No. PCT/CN2008/001553, dated Dec. 11, 2008 (4 pages).

*Primary Examiner* — William C Joyce
(74) *Attorney, Agent, or Firm* — Hamre, Schumann, Mueller & Larson, P.C.

(57) ABSTRACT

A cam self-adaptive automatic speed shift hub comprises a left hub frame (7), a right hub frame (18), a case body (4), a power input device, a drive shaft (1), a wheel (14) and a brake device (20). The hub further includes a low-gear drive shaft (12), a low-gear transmission mechanism positioned on the low-gear drive shaft (12), and a cone-disc clutch cam self-adaptive speed shift assembly positioned on the drive shaft (1), in which the low-gear drive shaft (12) positioned in the case body (4) is in rotation fit with the case body (4) and in parallel with the drive shaft (1). Such a cam self-adaptive automatic speed shift hub can allow the motor/engine output power and vehicle running condition always in an optimal matching state, to achieve balance control between the vehicle driving torque and the comprehensive driving resistance.

11 Claims, 12 Drawing Sheets

(56) References Cited

U.S. PATENT DOCUMENTS

| | | | | |
|---|---|---|---|---|
| 2,759,373 | A | * | 8/1956 | Orchard .................... 475/297 |
| 2,892,521 | A | * | 6/1959 | Spencer .................... 192/217.4 |
| 2,899,030 | A | * | 8/1959 | Douglas et al. ............ 192/217.4 |
| 2,972,908 | A | * | 2/1961 | Hood et al. ................. 475/294 |
| 2,982,384 | A | * | 5/1961 | Hood ........................ 192/217.4 |
| 3,648,809 | A | * | 3/1972 | Schwerdhofer ............ 192/217.4 |
| 4,858,494 | A | * | 8/1989 | Healy ......................... 475/266 |
| 5,938,560 | A | * | 8/1999 | Steuer ......................... 475/294 |
| 8,100,208 | B2 | * | 1/2012 | Jordan ....................... 180/65.51 |

FOREIGN PATENT DOCUMENTS

| | | |
|---|---|---|
| CN | 1799921 | 7/2006 |
| CN | 101244688 | 8/2008 |
| CN | 101244747 | 8/2008 |
| CN | 101244752 | 8/2008 |
| JP | 7246976 | 9/1995 |

\* cited by examiner

CAM SELF-ADAPTIVE AUTOMATIC SPEED SHIFT HUB

FIELD OF INVENTION

This invention relates to a hub for electric or petrol vehicle. In particular, it relates to a cam self-adaptive automatic speed shift hub.

BACKGROUND OF THE INVENTION

Currently, hubs of electric vehicles, electric motorcycles, electric bikes and petrol vehicles mainly use speed-regulating handle or accelerator pedal to directly control current control speed or to control oil supply control speed, or adopt manual control mechanical automatic speed shift mechanism to perform speed shift. Operation of the handle or accelerator pedal completely depends upon driver's operation; which typically causes mismatching of the operation with the vehicle condition, resulting in unstable motor running and locked rotating.

Without knowing the driving resistance, rider of the electric vehicle/petrol vehicle operates the speed shift device only based on his/her experience, and thus unavoidably may face the following issues: 1. When start-up, climbing uphill and under heavy load, the driving resistance increases, which forces the motor speed drop to run in a low-efficiency region, causing the battery to increase current supply, so that the motor is blocked to rotate and is heated, even is stopped to rotate; or the engine stops and gas consumption is too high. 2. Since there is no mechanical gear box to adjust torque and speed, the vehicle can only be widely used in plain area, and cannot satisfy the use in mountain areas, hills and under heavy load condition, which reduces range of applications. 3. For electrical vehicle, the installation space at the driving wheel is limited. Upon installing the motor, it is very hardly to have room for automatic gear box and other new technologies. 4. The vehicle does not have self-adaptive function, and cannot automatically detect, correct and eliminate wrong operation by the driver/rider. 5. When there is a sudden change in speed, motor/engine will be run under unsteady state, which inevitably causes that the output power of motor/engine and driving resistance can hardly match. 6. Continuous running distance is short, climbing hill ability is poor, and application range is limited.

In order to solve the above problems, a series of automatic gear boxes have appeared. However, due to their complicated structure and high cost, it is unable to fulfill the actual applications.

Thus, it is desired to have an automatic speed shift hub, with simple structure, small size, light weight, which can self-adaptively conduct automatic gear shift as the driving resistance changes without cutting off the drive force, to solve the issue that the vehicle cannot satisfy complex road conditions due to small change of motor torque-speed. In addition, less space is needed for installation.

SUMMARY OF THE INVENTION

One object of the present invention is to provide a cam self-adaptive automatic speed shift hub, which can automatically detect torque-rotation speed and driving resistance—vehicle speed signals according to driving resistance, to allow motor/engine output power always at an optimal matching state with vehicle driving condition, and to achieve balance control between vehicle driving torque and comprehensive driving resistance. Further, it can self-adaptively conduct automatic gear shift as the driving resistance changes without cutting off driving force, to satisfy the use in mountain areas, hills and under heavy load conditions, with a stable and slow vehicle speed change. In addition, the present invention is characterized in simple structure, small size, light weight, compact construction, and low manufacturing cost, suitable for installation at hubs.

The cam self-adaptive automatic speed shift hub of the present invention includes a left hub frame, a right hub frame, a case body, a power input arrangement, a drive shaft, a wheel and a brake, in which the left hub frame and right hub frame are relatively fixedly connected with the case body, with a portion of the drive shaft projects from the case body to securely fit with the wheel in circumferential direction, the left hub frame and right hub frame are respectively positioned on one side of the wheel, characterized in that: further including a low-gear drive shaft, a low-gear transmission mechanism arranged on the low-gear drive shaft, and a cam self-adaptive speed shift assembly arranged on the drive shaft; in which the low-gear drive shaft is positioned within the case body in running fit with the case body and in parallel with the drive shaft;

a. the low-gear transmission mechanism includes a low-gear gear and a low-gear overrunning clutch that are in parallel sleeved on and circumferentially fitted with the low-gear drive shaft; the low-gear overrunning clutch is provided with a low-gear gear ring; the low-gear gear fits with the low-gear gear ring via the low-gear overrunning clutch;

b. the cam self-adaptive speed shift assembly includes a drive shaft, a clutch, a speed shift spring and a transmission gear positioned on the drive shaft; the clutch has a driving transmission part and a driven transmission part that can be clutched/released;

The transmission gear engages with the low-gear gear ring; the driving transmission part of the clutch engages with the low-gear gear;

The drive shaft is provided with at least one cam slot in spiral expanded on the periphery. The cam slot is inserted with a cam pin. The clutch conducts clutch/release with cooperation of the speed shift spring, cam slot and cam pin, based on the driving resistance. The clutch engaging, the gear box high-gear transmission, and the clutch releasing, perform low-gear drive via the low-gear gear, the low-gear overrunning clutch and the low-gear gear ring in sequence.

Further, the cam self-adaptive speed shift assembly is a cone-disc clutch cam self-adaptive speed shift assembly. The clutch includes a torus axial outer cone-disc and a torus axial inner cone-disc gear ring. The transmission gear is sleeved on the drive shaft in clearance fit;

The torus axial inner cone-disc gear ring engages with the low-gear gear, with the inner circle as an axial tapered surface, the torus axial inner cone-disc gear ring is circumferentially fit with the power input device; the outer periphery of the torus axial outer cone-disc is an axial tapered surface; the torus axial inner cone-disc gear ring is sleeved on the outer periphery of the torus axial outer cone-disc in an manner of tapered surfaces engagement; the torus axial outer cone-disc is provided with radial pin holes I that are in same number as the cam slots on the periphery; the torus axial outer cone-disc is sleeved on the drive shaft in clearance fit, with the cam pins inserted into the cam slots through the radial pin holes I; the speed shift spring is sleeved on the drive shaft in clearance fit, with one end securely positioned to the drive shaft, and the other end against the torus axial outer cone-disc; the inner tapered surface of the torus axial inner cone-disc gear ring tightly fits with the outer tapered surface of the torus axial outer cone-disc under the effect of the speed shift spring; ends of the transmission gear engage with ends of the torus axial outer cone-disc.

Further, the cam self-adaptive speed shift assembly is a clutch sheet type cam self-adaptive speed shift assembly. The clutch includes a driving clutch gear ring, at least one piece of driving friction plate, a driven transmission sleeve, and driven friction plate which composes a friction pair with the driving friction plate. The driving clutch gear ring is circumferentially fitted with the power input device. The transmission gear is sleeved on the drive shaft in clearance fit;

The driving clutch gear ring engages with the low-gear gear. The driven transmission sleeve is distributed with same number of radial pin holes II as that of the spiral cam slots on the periphery. The driven transmission sleeve is sleeved on the outer periphery of the cam shaft in clearance fit. The cam pin is inserted into the spiral cam slot of the cam shaft through the radial pin hole II, and the driving clutch gear ring rotationally fits with the driven transmission sleeve on the outer periphery. End faces of the driving clutch gear ring and driven transmission sleeve are each provided with axial spline grooves. The driving friction plate fits with the driving clutch gear ring via the spline grooves on the outer periphery. The driven friction plate fits with the driven transmission sleeve via the spline grooves on the inner circle. The driving friction plate and driven friction plate are spaced from each other and alternatively installed, and tightly fit with each other under the effect of speed shift spring. End of the transmission gear engages with end of the torus axial outer cone-disc.

Further, the power input device is an exterior rotor motor; an inner cooling water tank is positioned within the cavity between the motor stator and the shaft. The inner cooling water tank is securely positioned within the case body. The motor stator is tightly against and fixedly sleeved on a housing of the inner cooling water tank. The cavity further includes an exterior cooling water tank. The exterior cooling water tank is positioned on outer periphery of the motor. The exterior cooling water tank is in communication with the inner cooling water tank through at least one channel.

Further, the case body is composed of a left gear box and a right gear box fixedly connected. The exterior cooling water tank constitutes a circumferential housing of the left gear box. The channel is positioned within the right end cover of the left gear box. The inner cooling water tank is fixedly positioned on the right end cover of the left gear box in communication with the channel. The motor rotor is turned to right on the left side of the motor, to securely fit with the torus axial inner cone-disc gear ring or the driving clutch gear ring in the circumferential direction through the cavity between the inner cooling water tank and the drive shaft. The exterior cooling water tank is configured with radiation sheets on the outer periphery.

Further, a reversing clutch mechanism is included. The drive shaft is securely fit with the wheel via the reversing clutch. The reversing clutch mechanism includes a reversing clutch lever, a return spring, a clutch block, an engagement block and a short shaft. The short shaft overlaps with the drive shaft axis. The short shaft is axially hollow. An end of the drive shaft is provided with radial through-slot. The clutch block is embedded into the radial through-slot on the end of the drive shaft. The reversing clutch lever goes through the axially hollow portion of the short shaft to axially securely connect with the clutch block. One end of the return spring is securely connected with the drive shaft; and the other end abuts against the clutch block. The engaging ring is sleeved onto the short shaft. The outer circle securely fits with the wheel in circumferential direction through the gear frame.

The clutch block axially engages with the engaging ring under the effect of the return spring.

Further, the low-gear overrunning clutch is a wedge-type overrunning clutch, including a wedge, a wedge spring, a left wedge baffle and a right wedge baffle. The axial extension of the low-gear ring serves as inner ring of the wedge-type overrunning clutch. The wedge is positioned between the left wedge baffle and the right wedge baffle through the wedge shaft. The wedge spring is sleeved onto the wedge shaft, with one end acting on the wedge in a manner of a torsion spring, and the other end acting on the adjacent wedge, to allow the inner ring and outer ring of the wedge-type overrunning clutch to engage with each other.

Further, the speed shift spring is positioned on the left of the torus axial outer cone-disc, within the cavity between the inner cooling water tank and the drive shaft. The expansion direction of the cam slot, when viewing from left to right, is opposite to the rotation direction of the drive shaft.

Further, the speed shift spring is a belleville spring set. A pre-stress adjusting ring is positioned between the speed shift spring and the torus axial outer cone-disc. The cam pin is inserted into the cam slot through the cam pin bushing which is in clearance fit with the cam pin.

Further, the right hub frame is securely connected with the case body through the brake. The clutch block axially engages with the engaging ring through a clutch gear ring that is securely connected with the clutch block. The clutch gear ring engages with the engaging ring through end face spline.

Further, the power input device is a sprocket, further including a sensing mechanism. The sensing mechanism includes a sensing mechanism housing relatively secured to the case body, a sprocket driving drum, a sensing cam pin, a sensing shaft, a sensing drum securely connected with the sensing shaft, a sensing spring and a sensing frame. The sprocket is securely fitted onto the sprocket driving drum circumferentially. The sprocket driving drum is sleeved onto the torus axial inner cone-disc gear ring in clearance fit. The sensing drum is in parallel positioned with the torus axial inner cone-disc gear ring, and is securely fitted with the torus axial inner cone-disc gear ring in the circumferential direction in a way of axially movable. At least one spirally-expanded cam through-slots are arranged on the periphery of the sprocket driving drum. An equal number of pin slots as that of the cam through-slots are arranged on the periphery of the sensing drum. The sensing cam pin goes through the cam through-slot to insert into the pin slot. The sensing frame and the sprocket driving drum are securely connected and in rotation fit with the sensing shaft. The sensing shaft goes through an end cover of the sensing frame. One end of the sensing spring is fixed to the sensing shaft, and the other end abuts against an end cover of the sensing frame. Magnetic steel is positioned at an end that the sensing shaft goes through the end cover of the sensing frame. A Hall sensor corresponding to the magnetic steel is positioned on the sensing mechanism housing.

Further, the speed shift spring is positioned on the right side of the torus axial outer cone-disc, within the cavity between the torus axial inner cone-disc gear ring and the drive shaft. The expansion direction of the cam slot, when viewing from left to right, is same as the rotation direction of the drive shaft. The sensing mechanism is positioned on the right end of the drive shaft. The expansion direction of the cam through-slot, when viewing from left to right, is opposite to the rotation direction of the drive shaft. The sensing cam pin goes through the cam through-slot via the sensing cam pin bushing. The sensing spring is belleville spring set.

The technical effects of the present invention are: The cam self-adaptive automatic speed shift hub of the present invention can detect driving torque-rotation speed and driving resistance—vehicle speed signal based on driving resistance, so that the motor output power and vehicle running condition are always at optimal matching state, to realize balance control of the vehicle driving torque and comprehensive driving resistance; can self-adaptively conduct automatic gear shift as the driving resistance changes without cutting off driving force, which facilitates energy efficient for the vehicle and mechanical power device, and can also control the vehicle to reduce emission, greatly improving power, economy, driving safety and comfort of the vehicle; since the hub can self-adaptively conduct automatic gear shift as the driving resistance changes without cutting off the driving force, the vehicle can satisfy the use in mountain areas, hills and under heavy load conditions, to allow the motor load to change stably, the vehicle to run steady, to improve safety; comparing with other automatic gear box, the present invention has advantages such as small size, light weight, simple structure, compact construction and low manufacturing cost, suitable for installing at hub, which more adapts for the electrical bike that is small in size and light in weight.

BRIEF DESCRIPTION OF THE DRAWINGS

Detailed description of the present invention will be discussed below in connection with the drawings and embodiments.

DETAILED DESCRIPTION OF THE PREFERRED EMBODIMENT

Figure 1:
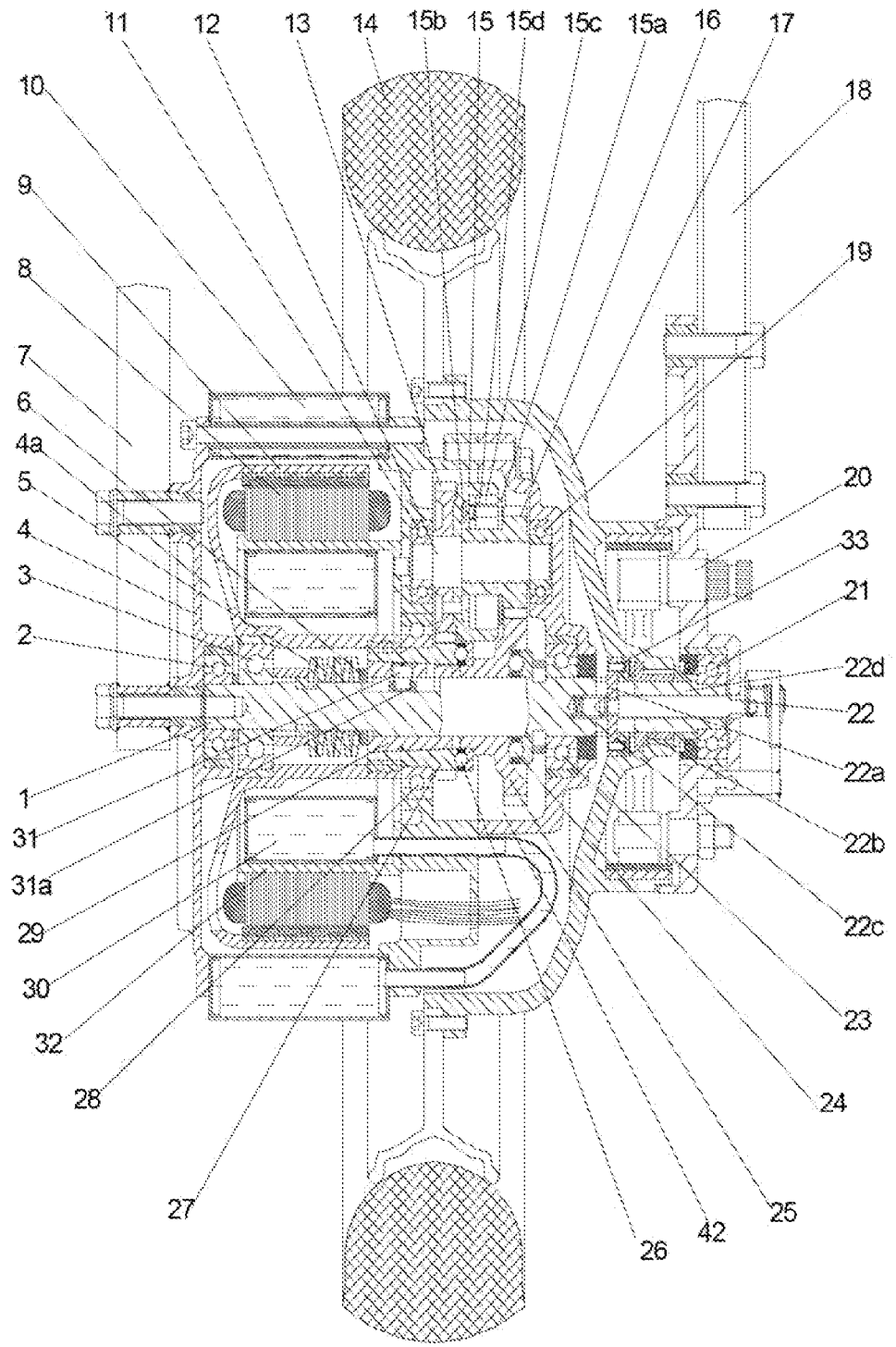
FIG. 1 is an axial cross sectional view according to an embodiment of the present invention.

FIG. 1 is an axial cross sectional view according to a first embodiment of the present invention. As shown in the drawing, the motor of this embodiment, when viewing from left to right, rotates in counter-clockwise in use, and the motor is an exterior rotor motor.

A cam self-adaptive automatic speed shift hub of the present invention includes a left hub frame 7, a right hub frame 18, a case body 4, a motor, a drive shaft 1, a wheel 14 and a brake 20. The case body 4 is composed of a left gearbox 4a and a right gearbox 4b securely connected. The left hub frame 7 is securely connected with the left gearbox 4a. The right hub frame 18 is securely connected with the right gearbox 4b through the brake 20. The motor is positioned within the case body 4 on the outer periphery of the drive shaft 1. A motor stator seat 32 is longitudinally positioned in the case body 4. A motor stator 8 is sleeved on and fit with the outer periphery of the motor stator seat 32. The hub further includes a cooling water tank, which has an exterior cooling water tank 10 and an inner cooling water tank 30. The exterior cooling water tank 10 is positioned on the outer periphery of the motor, to form a circumferential housing for the left gearbox 4a. The inner cooling water tank 30 is positioned in a cavity between the motor stator 8 and the drive shaft 1. The exterior cooling water tank 10 is in communication with the inner cooling water tank 30 via a channel 48. The inner cooling water tank 30 is securely positioned on a right end cover 49 of the left gearbox 4a, in communication with the channel 48. The motor rotor 9 is turned right on the left end of the motor, through the cavity between the inner cooling water tank 30 and the drive shaft 1, to circumferentially fit with the torus axial inner cone-disc gear ring 27. The exterior cooling water tank 10 has radiation sheets 10a on the exterior periphery.

Outer circle of each end of the drive shaft 1 fits with a left end face of the left gearbox 41 and a right end face of the right gearbox 42 respectively through a first radial rolling bearing 2 and a fourth radial rolling bearing 23. A portion of the drive shaft 1 extends out of the case body 4, to fit with the wheel 14 when moving forward. The left hub frame 7 and the right hub frame 18 are each positioned on one side of the wheel 14. The hub further includes a low-gear drive shaft 12, a low-gear transmission mechanism on the low-gear drive shaft 12, and a cone-disc clutch cam self-adaptive speed shift assembly on the drive shaft 1. The left and right ends of the low-gear drive shaft 12 respectively fits with the left and right end faces of the right gearbox 42 via a 6th radial rolling bearing 11 and a 7th radial rolling bearing 19. The low-gear drive shaft 12 is in parallel with the drive shaft 1.

a. The low-gear transmission mechanism includes a low-gear gear 13 and a low-gear overrunning clutch 15 in parallel sleeved on the low-gear drive shaft 12 and circumferentially engaged with the low-gear drive shaft 12. In this embodiment, the engagement adopts spline structure. The low-gear overrunning clutch 15 has a low-gear ring 16. The low-gear gear 13 circumferentially engages with the low-gear overrunning clutch 15 by means of bolt connection. The low-gear overrunning clutch 15 is a wedge-type overrunning clutch, including a wedge 15c, a wedge spring 15d, a left baffle 15b for the wedge and a right baffle 15a for the wedge. The axial extension of the low-gear ring 16 serves as the inner ring of the wedge-type overrunning clutch 15. The wedge 15c is positioned between the left wedge baffle 15b and the right wedge baffle 15a through the wedge shaft. Under the effect of the wedge spring 15d, the wedge 15c allows engagement between the inner ring and the outer ring of the wedge-type overrunning clutch 15.

b. The cone-disc clutch cam self-adaptive speed shift assembly comprises a drive shaft 1, a torus axial outer cone-disc 29, a torus axial inner cone-disc gear ring 27, a speed shift spring 5 and a transmission gear 25 sleeved on the drive shaft 1 in clearance fit.

The torus axial inner cone-disc gear ring 27 engages with the low-gear gear 13. The inner circle is an axial conical face. The motor rotor 9 turns on the left end of the motor, to circumferentially fit with the outer periphery of the torus axial inner cone-disc gear ring 27 through the spline structure. A third radial rolling bearing 28 is radially positioned between the outer periphery of the torus axial inner cone-disc gear ring 27 and the right end face of the left gearbox 41. A second radial rolling bearing 3 is positioned between the indirect portion of the motor rotor 9 and the drive shaft 1. The outer periphery of the torus axial exterior cone-disc 29 is an axial conical face. The torus axial inner cone-disc gear ring 27 is sleeved on the outer periphery of the torus axial exterior cone-disc 29 in a manner of conical face engagement. Three spirally expanded cam slots 1a are evenly distributed on the periphery of the drive shaft 1. An equal number of pin holes 29a to the cam slots 1a are processed on the periphery of the torus axial exterior cone-disc 29. The torus axial exterior cone-disc 29 is sleeved on the drive shaft 1 in clearance fit. The cam pins 31 insert into the cam slots 1a through the pin holes 29a. The cam pins 31 insert into the cam slots 1a through the cam pin sleeves 31a which are in clearance fit therewith, to reduce friction force between the cam pins 31 and the cam slots 1a. The speed shift spring 5 is sleeved on the drive shaft 1 in clearance fit, with one end securely positioned relative to the drive shaft 1, and the other end abutting against the torus axial exterior cone-disc 29. The inner conical face of the torus axial inner cone-disc gear ring 27 tightly fits with the outer conical face of the torus axial exterior cone-disc 29 under the effect of the speed shift spring 5. An initial stress adjusting ring 6 is positioned between the speed shift spring 5 and the torus axial exterior cone-disc 29. The speed shift spring 5 is positioned on the left side of the torus axial exterior cone-disc 29, within the cavity between the inner cooling water tank 30 and the drive shaft 1. In this embodiment, the speed shift spring 5 is a belleville spring set. The expansion direction of the cam slots 1a, when viewing from left to right, is opposite to the rotation direction of the drive shaft 1, i.e., in clockwise direction.

The transmission gear 25 engages with the low-gear ring 16, with the end engaging with an end of the torus axial exterior cone-disc 29. A first plane bearing 26 is positioned between the left end of the transmission gear 25 and the torus axial inner cone-disc gear ring 27, and a second plane bearing 24 is positioned between the right end and the 4th radial rolling bearing 23.

The hub further includes a reverse clutch mechanism. In normal use, the drive shaft 1 fits with the wheel 14 through the reverse clutch mechanism. The reverse clutch mechanism includes a reverse clutch lever 22, a return spring 22c, a clutch block 22a, an engaging block 22b and a short shaft 22d. The axis of the short shaft 22d overlaps with that of the drive shaft 1. The short shaft 22d is axially hollow. The ends of the drive shaft 1 are configured with a radial through-slot. The clutch block 22a is embedded into the radial through-slot at an end of the drive shaft 1. The reverse clutch lever 22 is axially securely connected with the clutch block 22a by extending through the axially hollow portion of the short shaft 22d. One end of the return spring 22c is securely connected with the drive shaft 1, and the other end abuts against the clutch block 22a. The engaging ring 22b is sleeved on the short shaft 22d, with the outer circle circumferentially engaging with the wheel 14 through the gear frame 17. The engaging ring 22b engages with the gear frame 17 by a spline structure. The clutch block 22a axially engages with the engaging ring 22b through the clutch gear ring 33 which is securely connected thereto, under the effect of the return spring 22c. The clutch gear ring 33 engages with the engaging ring 22b through the end face spline. The frame inner circle of the brake 20 fits with the right end of the short shaft 22b through the $5^{th}$ radial rolling bearing 21.

The above embodiment only illustrates the best mode of the present invention, and shall not be interpreted as limitation to the present invention. For instance, the motor is not limited to an exterior rotor motor, it can also be an interior rotor motor, with some adjustments in the connection. Some technical features can be modified accordingly, without affecting realization of the present invention objects.

The high-gear power transmission route of this embodiment is as follows:

The motor rotor→the torus axial inner cone-disc gear ring 27→the torus axial exterior cone-disc 29→the cam pin 31→the drive shaft 1→the clutch block 22a→the clutch gear ring 33→the engaging ring 22b→the gear frame 17→the wheel 14.

The low-gear power transmission route is as follows:

The motor rotor→the torus axial inner cone-disc gear ring 27→the low-gear gear 13→the low-gear drive shaft 12→the low-gear overrunning clutch 15→the low-gear ring 16→the transmission gear 25→the torus axial exterior cone-disc 29→the cam pin 31→the drive shaft 1→the clutch block 22a→the clutch gear ring 33→the engaging ring 22b→the gear frame 17→the wheel 14.

The high-gear transmission resistance transmission route and low-gear transmission resistance transmission route of the present invention are opposite to the power transmission route.

At the same time, the resistance is also transmitted through the following route: the drive shaft 1→the cam pin 31→the torus axial exterior cone-disc 29→compressed speed shift spring 5.

When the gearbox is running, the inner conical face of the torus axial inner cone-disc gear ring 27 tightly fits with the outer conical face of the torus axial exterior cone-disc 29 under the effect of the speed shift spring 5, to form an automatic gear shift mechanism that maintains certain pressure, and that can adjust the pressure required for clutch engagement by increasing the thickness of the initial stress adjusting ring 6, to implement transmission. Here, the motor rotor drives the torus axial inner cone-disc gear ring 27, the torus axial exterior cone-disc 29, the cam pin 31, the drive shaft 1, the clutch block 22a, the clutch gear ring 33, the engaging ring 22b and the gear frame 17, to have the wheel 14 to rotate in counter-clockwise. Now, the low-gear overrunning clutch is in the overrunning state.

When the vehicle starts, the resistance is larger than the driving force. The resistance forces the drive shaft 1 to rotate a certain angle in clockwise direction. Under the effect of cam slot 1a, the cam pin 31 moves in a direction to compress the speed shift spring 5, to drive the torus axial exterior cone-disc 29 to compress the speed shift spring 5. The torus axial exterior cone-disc 29 and the torus axial inner cone-disc gear ring 27 are separate. Synchronously, the low-gear overrunning clutch engages, driving the motor rotor to drive the torus axial inner cone-disc gear ring 27, the low-gear gear 13, the low-gear drive shaft 12, the low-gear overrunning clutch 15, the low-gear ring 16, the transmission gear 25, the torus axial exterior cone-disc 29, the cam pin 31, the drive shaft 1, the clutch block 22a, the clutch gear ring 33, the engaging ring 22b and the gear frame 17, to have the wheel 14 to rotate in low-gear speed. Thus, it automatically implements low-gear start-up, shortens the start-up time, and reduces the start-up force. Meanwhile, the speed shift spring 5 absorbs the energy of the movement resisting moment, to reserve the potential energy for recovering to high-gear to transmit power.

Upon successfully starting-up, the driving resistance reduces. When the component of forces reduces to less than the pressure in the automatic gear shift mechanism of the speed shift belleville spring generated by the speed shift spring 5, the pressure of the speed shift spring 5 created by the movement resistance compression quickly releases, to allow the outer conical face of the torus axial exterior cone-disc 29 and the inner conical face of the torus axial inner cone-disc gear ring 27 return to tightly fitting status, with the low-gear overrunning clutch in the overrunning state.

When reversing the vehicle, an exterior force is used to have the reverse clutch lever 22 to move towards the return spring 22c, to disengage the clutch gear ring 33 from the engaging ring 22b, so that the wheel 14 can have free rotation. The operation is simple and convenient.

When in driving, the automatic gear shift principle with respect to the change of movement resistance is same as discussed above. Gear shift can be implemented without the need to cut off the driving force, so that the overall vehicle can run smoothly and safely with low consumption. In addition, the transmission route is simplified, which improves the transmission efficiency.

Figure 2:
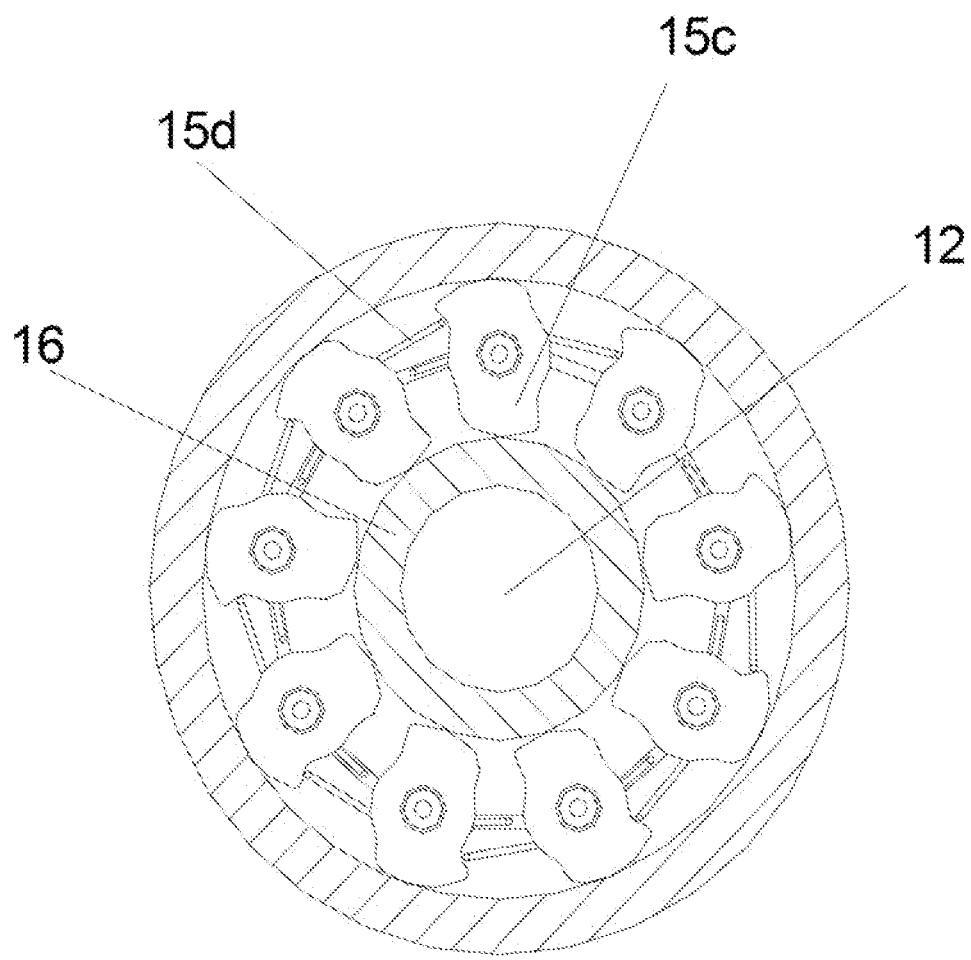
FIG. 2 is a schematic view of a low-gear overrunning clutch.

FIG. 2 is a schematic view of a low-gear overrunning clutch. As shown in the drawing, the low-gear overrunning clutch 15 is a wedge-type overrunning clutch, including a wedge 15c, a wedge spring 15d, a left baffle for wedge 15b and a right baffle for wedge 15a. The axial extension of the low-gear ring 16 serves as the inner ring of the wedge-type overrunning clutch 15. The wedge 15c is positioned between the left baffle for wedge 15b and the right baffle for wedge 15a through the wedge axis. Under the effect of the wedge spring 15d, the wedge 15c makes the inner ring and outer ring of the wedge-type overrunning clutch 15 to engage with each other. As shown in the drawing, when the inner ring rotates in counter-clockwise relative to the outer ring, the overrunning clutch engages. On the contrary, the overrunning clutch over-runs.

Figure 3:
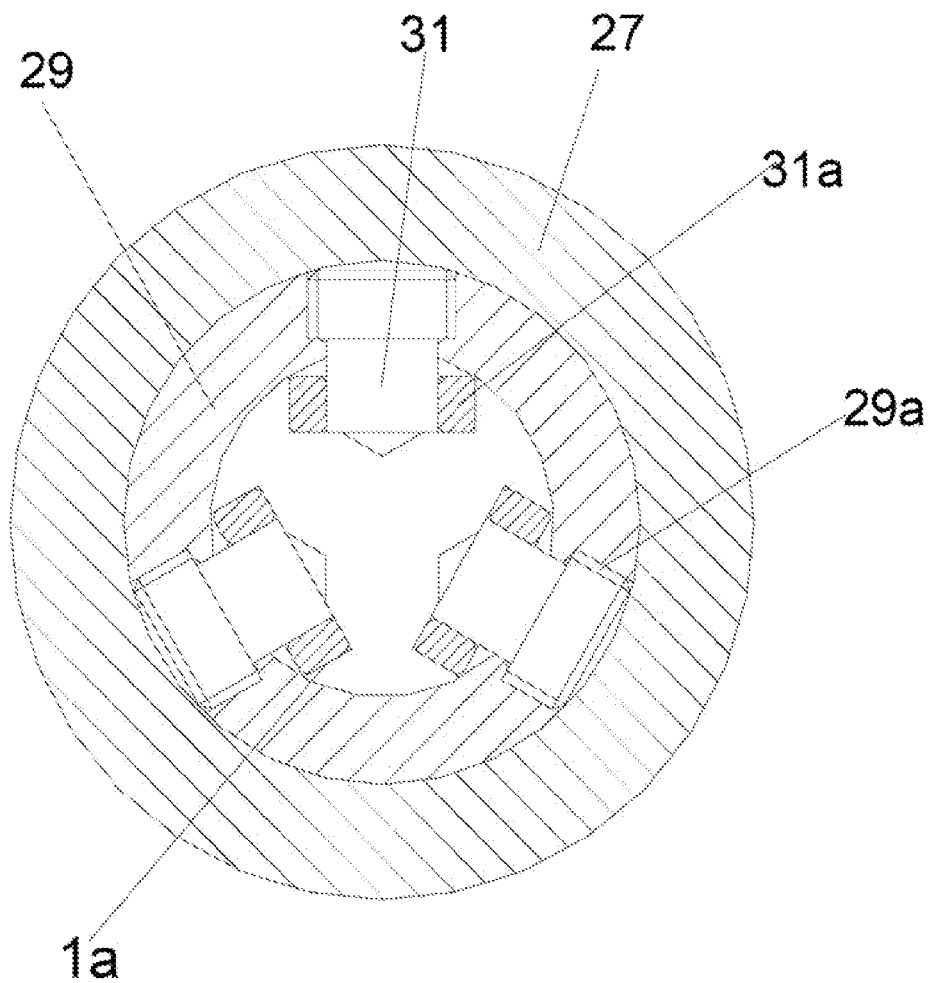
FIG. 3 is a radial cross sectional view of engagement between the torus axial outer cone-disc and the torus axial inner cone-disc gear ring.

FIG. 3 is a radial cross sectional view of engagement between the torus axial exterior cone-disc and the torus axial inner cone-disc gear ring. As shown in the drawing, the torus axial inner cone-disc gear ring 27 is sleeved on the outer periphery of the torus axial exterior cone-disc 29 in a manner of conical faces engaging with each other. Three spirally expanded cam slots 1a are evenly distributed on the periphery of the drive shaft 1. An equal number of pin holes 29a that matches to the cam slots 1a are processed on the periphery of the torus axial exterior cone-disc 29. The torus axial exterior cone-disc 29 is sleeved on the drive shaft 1 in clearance fit. The cam pins 31 insert into the cam slots 1a through the pin holes 29a. The inner conical face of the torus axial inner cone-disc gear ring 27 abuts against the outer conical face of the torus axial exterior cone-disc 29.

Figure 4:
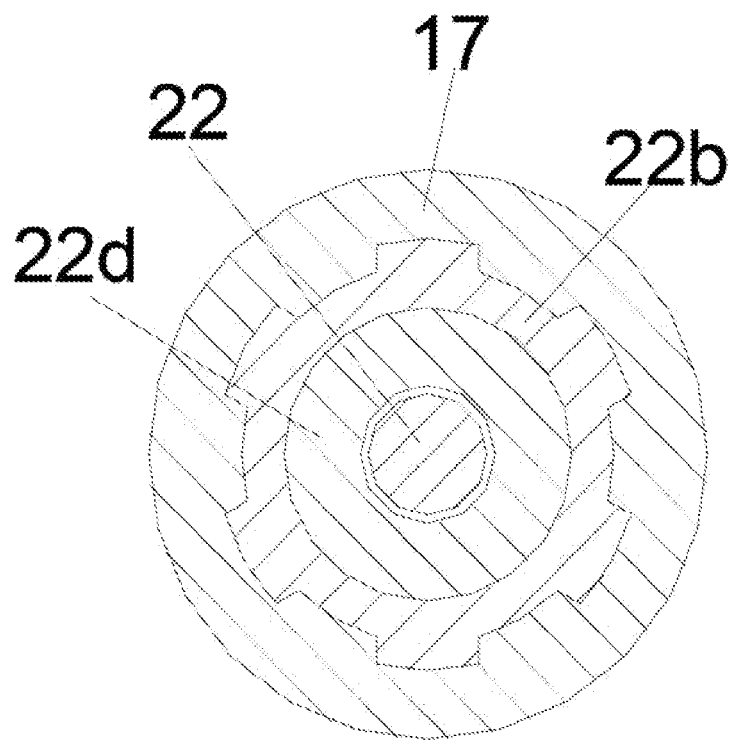
FIG. 4 is a radial cross sectional view of engagement between the engaging ring and the gear frame.
Figure 5:
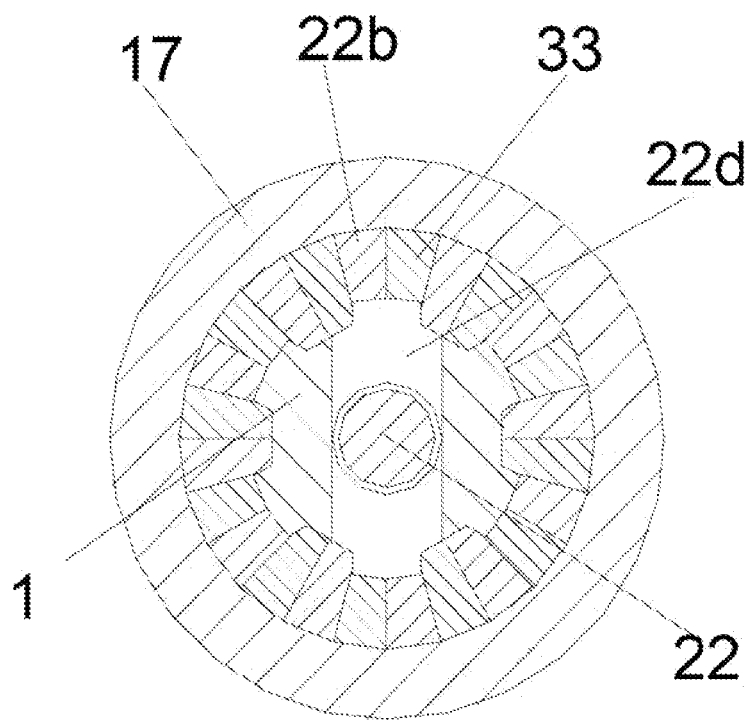
FIG. 5 is a radial cross sectional view of engagement between the clutch ring and the engaging ring.
Figure 6:
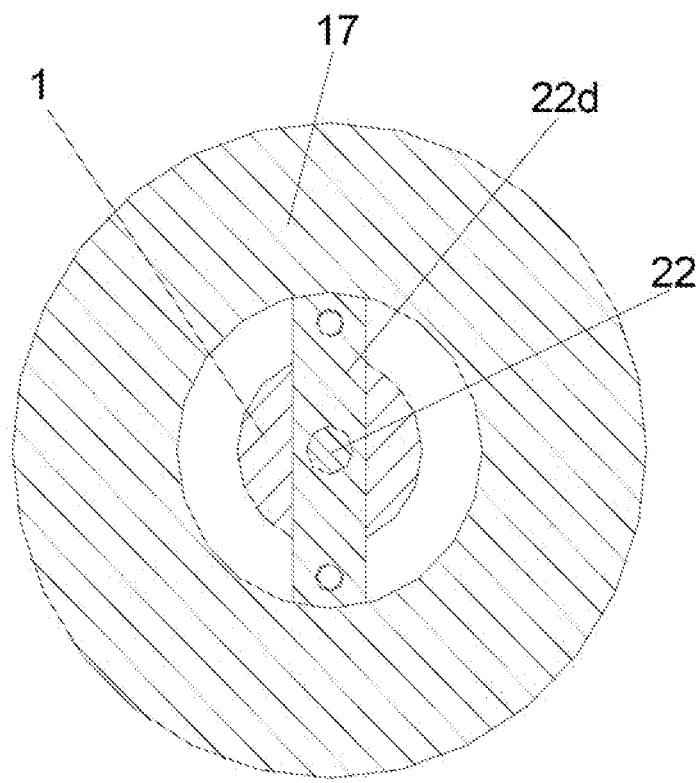
FIG. 6 is a radial cross sectional view of a clutch block installation.

FIG. 4 is a radially cross-sectional view of engagement between the engaging ring and the gear frame. FIG. 5 is a radially cross-sectional view of the engagement between the clutch ring and the engaging ring. FIG. 6 is a radially cross-sectional view of a clutch block installation. As shown in the drawings, the engaging ring 22b is sleeved on the short shaft 22d, with the outer circle circumferentially fitting with the wheel 14 through the gear frame 17. The engaging ring 22b engages with the gear frame 17 via a spline structure. The reverse clutch lever 22 extends through the axial hollow portion of the short shaft 22d.

The drive shaft 1 is configured with radial through-slots on its ends. The clutch block 22a is embedded into the radial through-slots at ends of the drive shaft 1. The reverse clutch lever 22 is axially securely connected with the clutch block 22a. The clutch block 22a, through the clutch gear ring 33 that securely connects thereto, axially engages with the engaging ring 22b via the end face spline.

Figure 7:
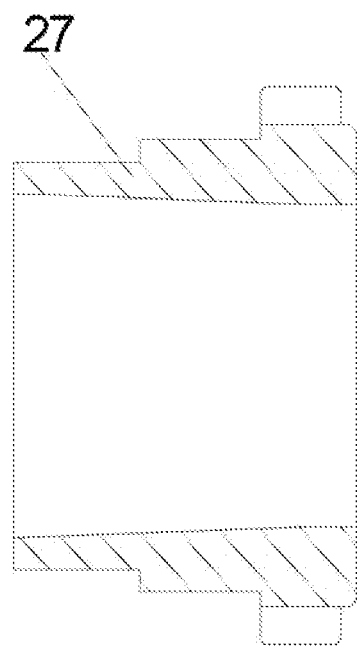
FIG. 7 is a cross sectional view of a torus axial inner tapered-disk gear ring according to an embodiment.
Figure 8:
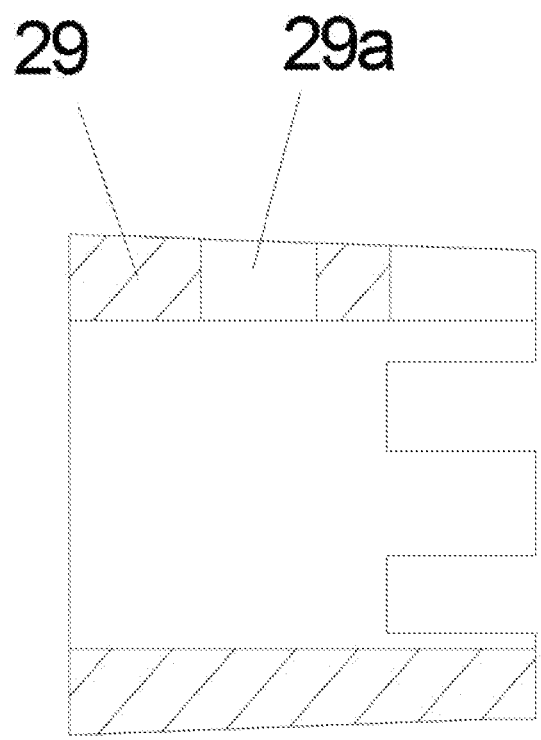
FIG. 8 is a cross sectional view of a torus axial outer cone-disc.

FIG. 7 is a cross-sectional view of a torus axial inner cone-disc gear ring according to one embodiment of the present invention. FIG. 8 is a cross-sectional view of the torus axial exterior cone-disc. As shown in the drawings, an exterior gear ring is positioned on the outer periphery of the torus axial inner cone-disc gear ring 27, with the inner circle as an axial conical face. The outer periphery of the torus axial exterior cone-disc 29 is an axial conical face, with pin holes 29a evenly distributed on the periphery of the torus axial exterior cone-disc 29.

Figure 9:
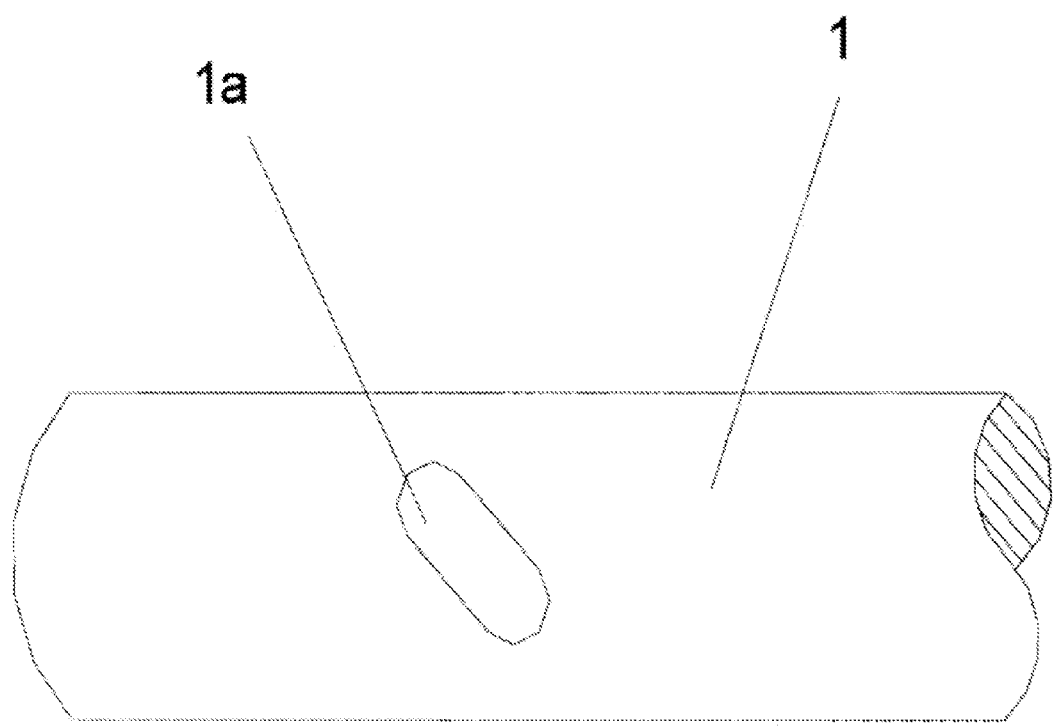
FIG. 9 is a schematic view of a drive shaft with cam slot thereon according to an embodiment.

FIG. 9 is schematic view of a cam slot positioned on the drive shaft according to one embodiment of the present invention. As shown in the drawing, three spirally expanded cam slots 1a are evenly distributed on the periphery of the drive shaft. In this embodiment, when viewing from left to right, the cam slots 1a are expanded in clockwise direction.

Figure 10:
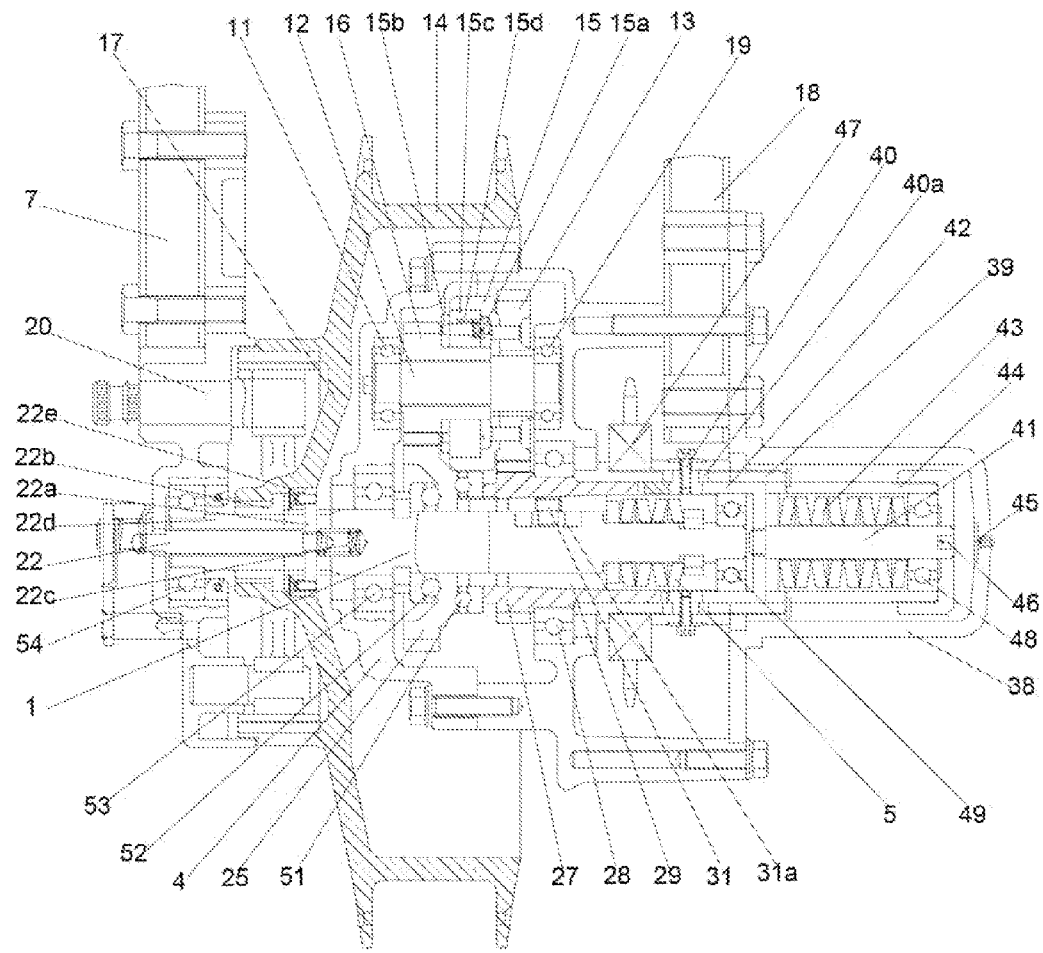
FIG. 10 is an axial cross sectional view according to a second embodiment of the present invention.

FIG. 10 is an axially cross-sectional schematic view according to a second embodiment of the present invention. As shown in the drawing, the sprocket of this embodiment, when in operation, rotates in counter-clockwise direction, if viewed from left to right. The differences between this embodiment and the first embodiment are: The power input device is a sprocket; the torus axial inner cone-disc gear ring 27' circumferentially engages with the sprocket; a initial stress adjusting ring 50 is positioned between the speed shift spring 5 and the torus axial outer cone-disc 29; the speed shift spring 5 is positioned on the right side of the torus axial exterior cone-disc 29, in which the speed shift spring 5 in this embodiment is belleville spring set; the expansion direction of the cam slots 1a, when viewed from left to right, is same as the rotation direction of the drive shaft 1, i.e., in counter-clockwise direction, which is opposite to that of the first embodiment.

The transmission gear 25 engages with the low-gear ring 16. The end of the transmission gear 25 engages with the end of the torus axial exterior cone-disc 29 through spline structure. A plane bearing I51 is positioned between the right end of the transmission gear 25 and the torus axial inner cone-disc gear ring 27'; and a plane bearing II24 is positioned between the left end and a radially rolling bearing I53.

This embodiment further includes a sensing mechanism, which is positioned on the right end of the drive shaft 1. The sensing mechanism includes a sprocket driving drum 39, a sensing cam pin 40, a sensing drum 42, a sensing shaft 41, a sensing spring 43, a sensing frame 44 and a sensing mechanism housing 38 mounted on the case body 4. The sprocket is sleeved on the sprocket driving drum 39, to circumferentially engage therewith. The sprocket driving drum 39 is sleeved on the torus axial inner cone-disc gear ring 27' in clearance fit. The sensing drum 42 is in parallel positioned with the torus axial inner cone-disc gear ring 27', and circumferentially engages with the torus axial inner cone-disc gear ring 27' in an axially movable manner. In this embodiment, engagement uses end face splines. Three spirally expanded cam through-slots 39a are evenly distributed on the periphery of the sprocket driving drum 39. The expansion direction of the sprocket driving drum 39, when viewed from left to right, is same as the rotation direction of the drive shaft 1, i.e., in counter-clockwise direction. An equal number of pin slots 42a that matches to the cam through-slots 39a are arranged on the periphery of the sensing drum 42, to insert into the pin slots 42a through the cam through-slots 39a. The sensing cam pins 40 extend through the cam through-slots 39a via the sensing cam pin sleeves 40a, to reduce the friction force between the sensing cam pins 40 and the cam through-slots 39a. The torus axial inner cone-disc gear ring 27' has its end securely connected with the sensing shaft 41. The sensing frame 44 is securely connected with the sprocket driving drum 39, and in rotation engagement with the sensing shaft 41 via the radially rolling bearing II48. The sensing spring 43 has one end relatively fixed to the sensing shaft 41, and the other end abutted against the end cover of the sensing frame 44, in which the sensing spring 43 in this embodiment is a belleville spring set. The sensing shaft 41 extends through the end cover of the sensing frame 44. The end that the sensing shaft 41 extends through the end cover of the sensing frame 44 is provided with a magnetic steel 46 thereon. A Hall sensor 45 is positioned on the sensing mechanism housing 38 corresponding to the magnetic steel 46.

The drive shaft 1 has its left end outer circle to engage with the left end face of the case body 4 through the radially rolling bearing I53, and has its right end to engage with the inner circle of the sensing drum 42 through the radially rolling bearing IV49.

The high-gear power transmission route in this embodiment is as follows:

The sprocket→the sprocket driving drum 39→the sensing cam pin 40→the torus axial inner cone-disc gear ring 27'→the torus axial exterior cone-disc 29→the cam pin 31→the drive shaft 1→the clutch block 22a→the clutch gear ring 22e→the engaging ring 22b→the gear frame 17→the wheel 14.

The low-gear power transmission route is as follows:

The sprocket→the sprocket driving drum 39→the sensing cam pin 40→the torus axial inner cone-disc gear ring 27'→the low-gear gear 13→the low-gear drive shaft 12→the low-gear overrunning clutch 15→the low-gear ring 16→the transmission gear 25→the torus axial exterior cone-disc 29→the cam pin 31→the drive shaft 1→the clutch block 22a→the clutch gear ring 22e→the engaging ring 22b→the gear frame 17→the wheel 14.

The high-gear transmission resistance transmission route and the low-gear transmission resistance transmission route in this invention are opposite to the power transmission route.

In addition, the resistance is transmitted through the following route: the drive shaft 1→the cam pin 31→the torus axial exterior cone-disc 29→compressing speed shift spring 5.

When the gearbox is in operation, the inner conical face of the torus axial inner cone-disc gear ring 27 abuts tightly against the outer conical face of the torus axial exterior cone disk 29 under the effect of the speed shift spring 5, to form an automatic gear shift mechanism that maintains certain pressure, and that can adjust the pressure required for clutch engagement by increasing the thickness of initial stress adjusting ring 6, to implement transmission. Here, the sprocket drives the torus axial inner cone-disc gear ring 27', the torus axial exterior cone-disc 29, the cam pin 31, the drive shaft 1, the clutch block 22a, the clutch gear ring 22e, the engaging ring 22b and the gear frame 17, to have the wheel 14 to rotate in counter-clockwise direction. At this time, the low-gear overrunning clutch is in overrunning state.

When a vehicle starts up, the resistance is larger than the driving force. The resistance forces the drive shaft 1 to turn a certain angle in clockwise direction. Under the effect of the cam slots 1a, the cam pins 31 move in a direction to compress the speed shift spring 5, to drive the torus axial exterior cone-disc 29 to compress the speed shift spring 5. The torus axial exterior cone-disc 29 and the torus axial inner cone-disc gear ring 27' are separate. Synchronously, the low-gear overrunning clutch engages, driving the motor rotor to drive the torus axial inner cone-disc gear ring 27', the low-gear gear 13, the low-gear drive shaft 12, the low-gear overrunning clutch 15, the low-gear ring 16, the transmission gear 25, the torus axial exterior cone-disc 29, the cam pin 31, the drive shaft 1, the clutch block 22a, the clutch gear ring 22e, the engaging ring 22b and the gear frame 17, to allow the wheel 14 to rotate in a low-gear speed. Thus, it automatically realizes low-gear start-up, shortens the start-up time, and reduces the start-up force. At the same time, the speed shift spring 5 absorbs the energy of the movement resistance moment, to reserve potential energy for recovering to high-gear transmission power.

Upon successfully starting up, the driving resistance is reduced. When component of the force reduces to less than the pressure in the automatic gear shift mechanism of the speed shift belleville spring created by the speed shift spring 5, the pressure of the speed shift spring 5 generated by the movement resistance compression quickly releases, to allow the outer conical face of the torus axial exterior cone-disc 29 and the inner conical face of the torus axial inner cone-disc gear ring 27' to return to tightly fitting status; the low-gear overrunning clutch is in overrunning status.

When reversing the vehicle, an external force makes the reverse clutch lever 22 to move towards the return spring 22c, to disengage the clutch gear ring 22e from the engaging ring 22b, so that the wheel 14 can have free rotation. The operation is simple and convenient.

When in driving, the automatic gear shift principle with respect to the change of the movement resistance is the same as discussed above. Gear shift can be implemented without the need to cut off the driving force, so that the overall vehicle can run smoothly and safely with low consumption. In addition, the transmission route is simplified, which improves the transmission efficiency.

The resistance in turn drives the torus axial inner cone-disc gear ring 27', the sensing drum 3 and the sensing cam pin 40 to rotate in clockwise direction. Under the effect of the cam through-slots 39a on the sprocket driving drum 39, the sensing drum 42 drives the sensing shaft 41 to compress the sensing spring 43 to move towards right, so as to shorten the distance between the Hall sensor 45 and the magnetic steel 46, in which the Hall sensor 45 and the magnetic steel 46 transmit the displacement signal to an automatic control system, to achieve intelligent control.

Figure 11:
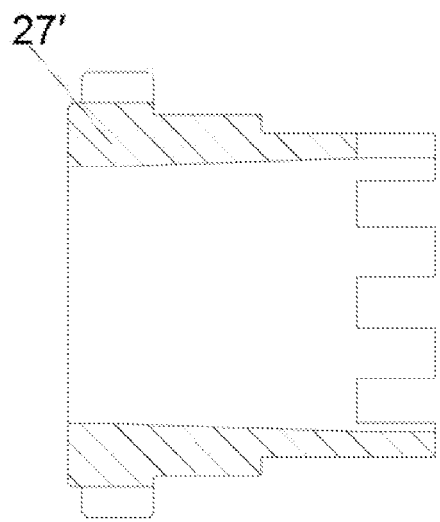
FIG. 11 is a cross sectional view of a torus axial inner cone-disc gear ring according to the second embodiment.

FIG. 11 is a cross-sectional view of a torus axial inner cone-disc gear ring according to the second embodiment of the present invention. As shown in the drawing, the torus axial inner cone-disc gear ring 27' is provided with outer gear ring on its outer periphery, with its inner circle as an axial conical face. Its right end is configured as a spline structure, which engages with the spline on the end face of the sensing drum 42 when installing, to realize axially movable and circumferentially engaged.

Figure 12:
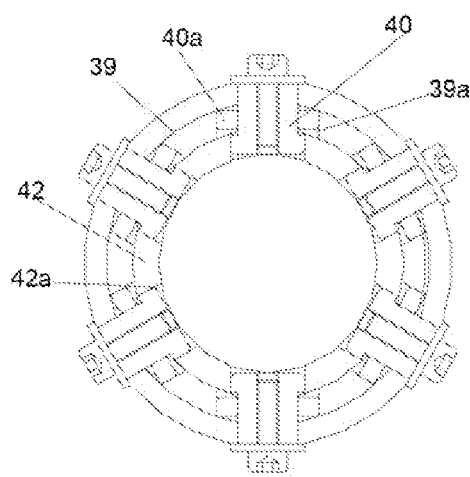
FIG. 12 is a radial cross sectional view of engagement between a sprocket driving drum and a torus axial inner cone-disc gear ring.

FIG. 12 is a radially cross-sectional view of engagement between the sprocket driving drum and torus axial inner cone-disc gear ring. As shown in the drawing, the sprocket driving drum 39 is sleeved on the torus axial inner cone-disc gear ring 27' in clearance fit. Three spirally expanded cam through-slots 39a are evenly distributed on the periphery of the sprocket driving drum 39. An equal number of the pin slots 42a that match with the cam through-slots 39a are provided on the outer periphery of the sensing drum 42. The sensing cam pins 40 extend through the cam through-slots 39a via the sensing cam pin sleeves 40a, to insert into the pin slots 3a.

Figure 13:
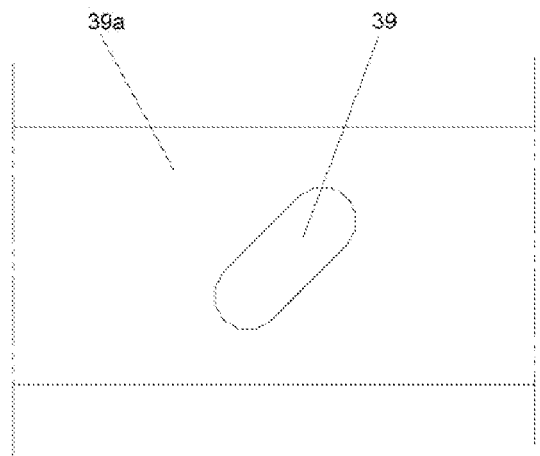
FIG. 13 is a schematic view of a sprocket driving drum with cam through-slot thereon.

FIG. 13 is a schematic view of a cam through-slot positioned on the sprocket driving drum. As shown in the drawing, spirally expanded cam through-slots 39a are provided on the periphery of the sprocket driving drum 39. The expansion direction, when viewing from left to right, is same as the rotation direction of the drive shaft 1, i.e., in counter-clockwise direction.

Figure 14:
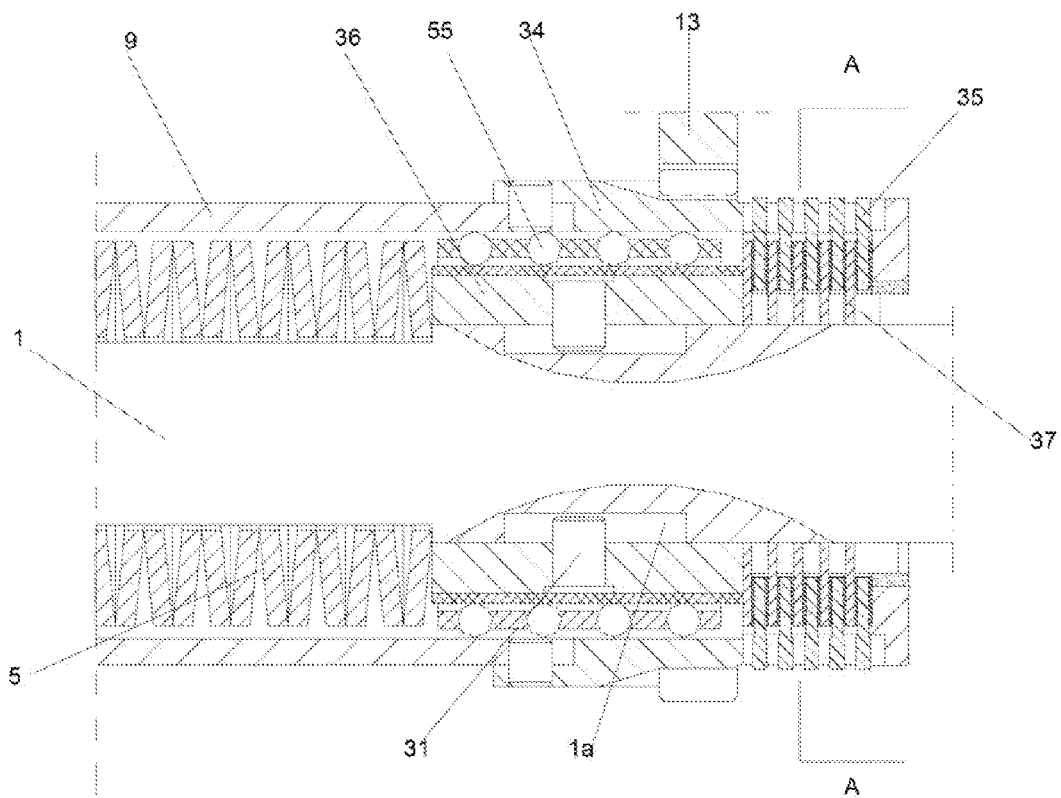
FIG. 14 is a schematic view of a clutch disc type cam self-adaptive speed shift assembly.
Figure 15:
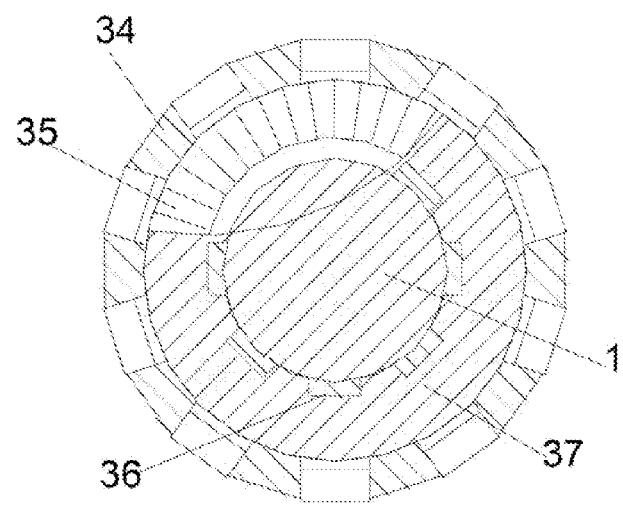
FIG. 15 is a cross sectional view taken in A-A of FIG. 1.

FIG. 14 is a schematic view of a clutch sheet type cam self-adaptive speed shift assembly. FIG. 15 is a cross-sectional view taken along A-A of FIG. 14. As shown in the drawings, the cam self-adaptive speed shift assembly is a clutch sheet type cam self-adaptive speed shift assembly. The clutch includes a driving clutch gear ring 34, five pieces of driving friction plates 35, a driven transmission sleeve 36, and five pieces of driven friction plates 37 which form friction pair with the driving friction plates. The driving clutch gear ring 34 circumferentially engages with the power input device. The transmission gear 25 is sleeved on the drive shaft 1 in clearance fit.

The driving clutch gear ring 34 engages with the low-gear gear 13. An equal number of radial pin holes II36a that match with the spirally expanded cam slots 1a are evenly distributed on the periphery of the driven transmission sleeve 36, in this embodiment the number is six. The driven transmission sleeve 36 is sleeved on the outer periphery of the cam shaft 1 in clearance fit. The cam pins 31 go through the radial pin holes II36a via the cam pin sleeves 31a in clearance fit therewith, to insert into the spiral cam slots 1a on the cam shaft 1. The driving clutch gear ring 34 is sleeved on the outer periphery of the driven transmission sleeve 36, in rotation fit therewith via rollers 55. The end faces of the driving clutch gear ring 34 and driven transmission sleeve 36 each is provided with axial spline grooves. The driving friction plate 35 fits with the driving clutch gear ring 34 through spline grooves on the outer periphery. The driven friction plate 37 fits with the driven transmission sleeve 36 via the spline grooves on the inner periphery. The driving friction plate 35 and driven friction plate 37 are alternatively installed and spaced from each other, and abut against each other under the effect of the speed shift spring 5. The end of the transmission gear 25 engages with the end of the torus axial outer cone-disc 29.

Figure 16:
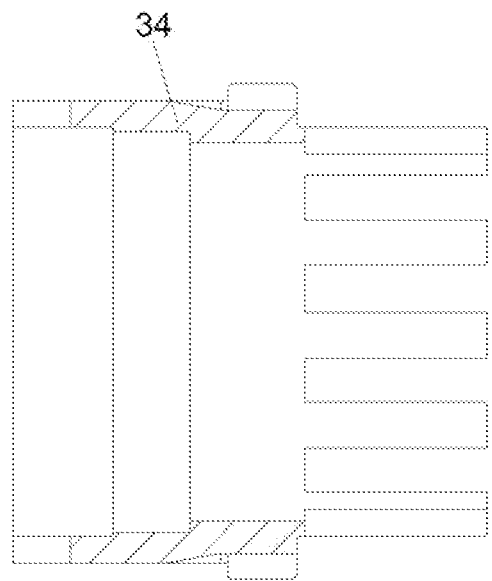
FIG. 16 is a schematic view of a driving clutch gear ring of the present invention.

FIG. 16 is a schematic view of a driving clutch gear ring of the present invention. As shown in the drawing, and in connection with FIG. 15, the right end face of the driving clutch gear ring 34 is processed with axial spline grooves that fit with spline grooves on the outer periphery of the driving friction plate 35.

Figure 17:
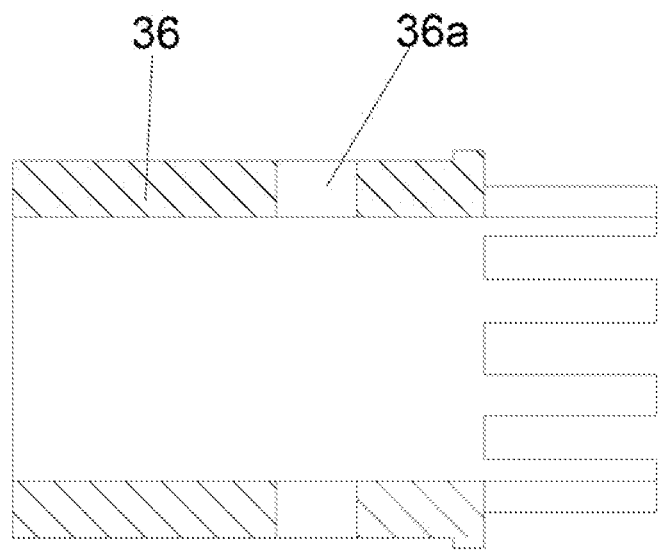
FIG. 17 is a schematic view of a driven transmission sleeve of the present invention.

FIG. 17 is a schematic view of a driven transmission sleeve of the present invention. As shown in the drawing, and in connection with FIG. 15, six radial through-holes 36a are evenly distributed on the periphery of the driven transmission sleeve. The right end face of the driven transmission sleeve 36 is processed with axial spline grooves that fit with spline grooves on the inner periphery of the driven friction plate 37.

Figure 18:
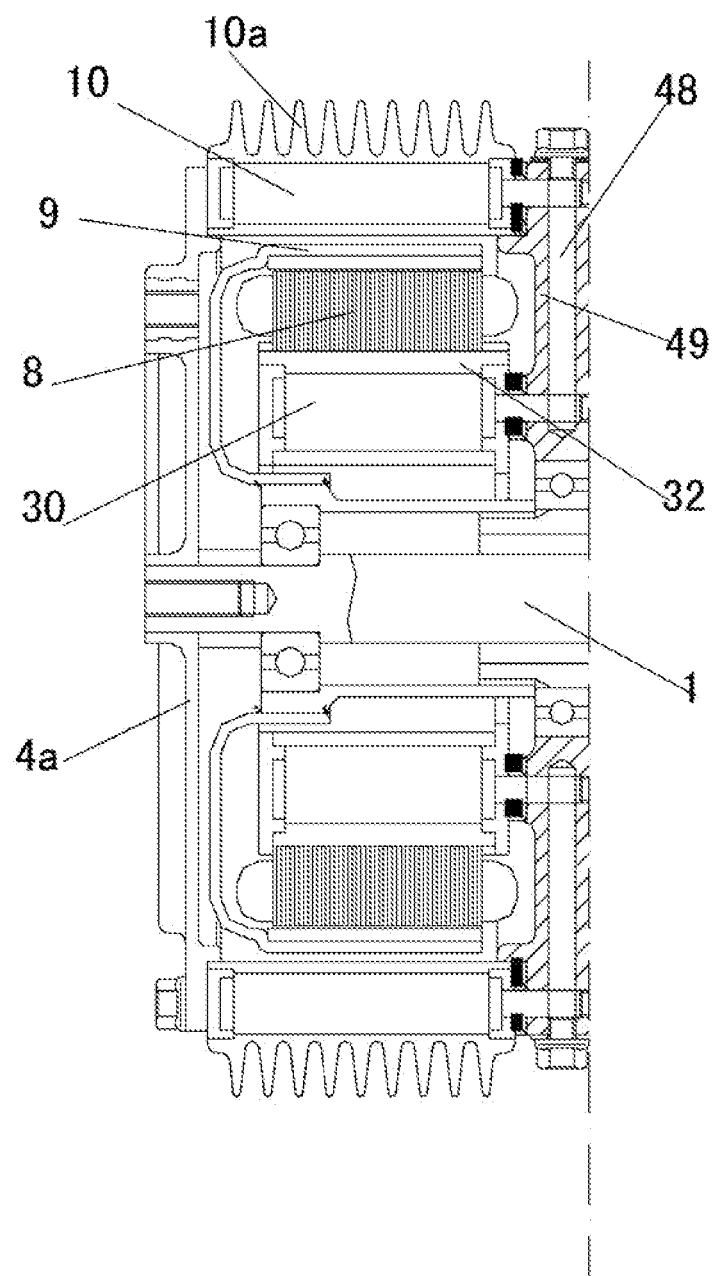
FIG. 18 is a schematic view of a preferred cooling water tank.

FIG. 18 is a schematic view of a preferred cooling water tank. As shown in the drawing, the case body 4 is composed of a left gearbox 4a and a right gearbox 4b securely connected. The external cooling water tank 10 forms the peripheral housing of the left gearbox 4a. The channel 48 is arranged within the right end cover 49 of the left gearbox 4a. The inner cooling water tank 30 is securely positioned on the right end cover 49 of the left gearbox 4a, in communication with the channel 48. The motor stator 8 abuts against and sleeves on the housing 32 of the inner cooling water tank 30. The motor rotor 9 turns right on the left end of the motor, and goes through the cavity between the inner cooling water tank 30 and the drive shaft 1. Radiation sheets are positioned on the outer periphery of the external cooling water tank 10. The invention adopts the system of inner and external cooling water tanks, using convection principle of cooling water, to effectively dissipate heat generated by motor operation. In addition, the system still can effectively dissipate heat when the motor runs for long time, to ensure the motor to have relatively high work efficiency, so as to save energy, extend service life of the motor, with simple and compact structure, and not adding volume to the electric hub. The external cooling water tank is provided with radiation sheets, which further improves heat dissipation effects. In addition, the external cooling water tank can serve as the case body wall, so that the present invention can have small volume, compact structure, reducing the manufacturing cost. Water flow channel is positioned in the end cover, to further reduce the volume, and make the structure more compact, suitable for the electric vehicles that have features such as flexible, light and convenient. The internal and external cooling water tanks respectively uses screw and screw bushing welded within the water tank to be securely connected, so that it is easy to disassemble, good in sealing, and reduces failure rate.

It is understood that the above embodiments are only for illustrative, but not for limitative. Although detailed description has been provided to the present invention in connection with the best mode embodiments, it is understood to people skilled in the art that any modification or equivalent replacement to the technical solutions of the present invention, without departing from the spirits or scopes of the present invention, shall be construed within the scope of the appended claims.

We claim:

1. A cam self-adaptive automatic speed shift hub, comprising:
   a left hub frame, a right hub frame, a case body, a power input device, a drive shaft, a wheel, arid a brake device;
   the left hub frame and the right hub frame are securely connected relative to the case body;
   a portion of the drive shaft extends out the case body to circumferentially cooperate with the wheel;
   the left hub frame and the right hub frame are respectively positioned on either side of the wheel; wherein
   the hub further including a low-gear drive shaft, a low-gear transmission mechanism provided on the low-gear drive shaft, and a cam self-adaptive speed shift assembly provided on the drive shaft;
   the low-gear drive shaft is positioned within the case body, rotatable with respect to the case body and in parallel with the drive shaft;
   the low-gear transmission mechanism includes as low-gear gear and a low-gear overrunning clutch in parallel sleeved on and circumferentially engaged with the low-gear drive shaft; the low-gear overrunning clutch is provided with a low-gear ring;
   the low-gear gear fits with the low-gear ring through the tow-gear overrunning clutch;
   the cam self-adaptive speed shift assembly includes the drive shaft, a clutch, a speed shift spring and a transmission gear positioned on the drive shaft; the clutch comprises a driving transmission part and a driven transmission part that can be engaged and disengaged;

the transmission gear engages with the low-gear ring; and
the driving transmission part of the clutch engages with
the low-gear gear;
at least one spirally expanded cam slot is provided on the
periphery of the drive shaft, with a cam pin inserted into
the cam slot;
the clutch implements engaging/releasing based on the
driving resistance, with the cooperation of the speed
shift spring, the cam slot and the cam pin;
when the clutch engages, the high-gear transmission is
conducted;
when the clutch is disengaged, the low-gear transmission is
implemented through the low-gear gear, the low-gear
overrunning clutch, and the low-gear ring in sequence;
wherein the cam self-adaptive speed shift assembly is a
clutch disc cam self-adaptive speed shift assembly;
the clutch includes a driving clutch gear ring, at least one
driving friction plate, a driven transmission sleeve, and a
driven friction plate that forms a friction pair with the
driving friction plate;
the driving clutch gear ring circumferentially fit with the
power input device;
the transmission gear is sleeved on the drive shaft in clearance fit;
the driving clutch gear ring engages with the low-gear gear;
an equal number of radial pin holes (II) that match with
the number of the spiral cam slots are evenly disturbed
on the periphery of the driven transmission sleeve;
driven transmission sleeve is sleeved on the outer periphery
of the cam shaft in clearance fit;
the cam pin inserts into the spiral cam slot of the cam shaft
through the radial pin hole (II);
the driving clutch gear ring is sleeved on the outer periphery of the driven transmission sleeve to have a rotation fit
with the driven transmission sleeve;
the driving clutch gear ring and the driven transmission
sleeve each have their end face processed with an axial
spline groove; the driving friction disc fits with the driving clutch gear ring via the spline groove on the outer
periphery; the driven friction disc fits with the driven
transmission sleeve via the spline groove on the inner
periphery; the driving friction disc and the driven friction disc are alternatively installed spaced from each
other, and tightly fit with each other under the effect of
the speed shift spring; and
an end of the transmission gear engages with an end of an
axially extending annular member which has an outer
conical face.

2. The cam self-adaptive automatic speed shift hub according to claim 1, wherein the cam self-adaptive speed shift
assembly is a conical clutch disc cam self-adaptive speed shift
assembly;
the clutch includes the axially extending annular member
and an axially extending gear ring;
the transmission gear is sleeved on the drive shaft in clearance fit;
the axially extending gear ring engages with the low-gear
gear, in which the axially extending gear ring has an
inner conical face, the axially extending gear ring circumferentially fit with the power input device;
the axially extending gear ring is sleeved on the outer
periphery of the axially extending annular member in a
manner of conical face engagement;
an equal number of radial pin holes (I) that match with the
number of the cam slots are provided on the periphery of
the axially extending annular member; the axially
extending annular member is sleeved on the drive shaft
in clearance fit;
the cam pin inserts into the cam slot through the radial pin
hole if (I);
the speed shift spring is sleeved on the drive shaft in clearance fit, with one end of the spring securely positioned
with respect to the drive shaft, and the other end abuts
against the axially extending annular member; and
the inner conical face of the axially extending gear ring
tightly fits with the outer conical face of the axially
extending annular member under the effect of the speed
shift spring.

3. The cam self adaptive automatic speed shift hub according to claim 2, wherein the power input device is an exterior
rotor motor;
an internal cooling water tank is securely positioned in a
cavity between the motor stator and the shaft;
the internal cooling water tank is securely positioned in the
ease body;
the motor stator is tightly fitted with and sleeved on a
housing of the internal cooling water tank;
further including an external cooling water tank;
the external cooling water tank is positioned on the outer
periphery of the motor;
the external cooling water tank communication with the
internal cooling water tank via at least one channel.

4. The cam self-adaptive automatic speed shift hub according to claim 3, wherein the case body is composed of a left
gearbox and a right gearbox securely connected with each
other;
the external cooling water tank constitutes a peripheral
housing of the left gearbox;
the channel is positioned within the right end cover of the
left gearbox;
the internal cooling water tank is securely positioned on the
right end cover of the left gearbox, in communication
with the channel;
the motor rotor turns clockwise on the left end of the motor,
to circumferentially engage with the axially extending
gear ring or the driving clutch gear ring via the cavity
between the internal cooling water tank and the drive
shaft;
the external cooling water tank is provided with a radiation
sheet on its outer periphery.

5. The cam self-adaptive automatic speed shift hub according to claim 4, further including a reverse clutch;
the drive shaft fits with the wheel via the reverse clutch;
the reverse clutch includes a reverse lever, a return spring,
a clutch block, a engaging block, and a short shaft; the
short shaft has its axis in overlap with that of the drive
shaft;
the short shaft is axially hollow;
the time shaft is provided with a radial through-slot on an
end;
the clutch block is embedded into the radial through-slot on
the end of the drive shaft;
the reverse clutch lever is axially securely connected with
the clutch block through the axially hollow portion of the
snort shaft;
the return spring has one end securely connected with the
drive shaft, has the other end abuts against the clutch
block;
the gear ring is sleeved onto the short shaft, with the outer
circle circumferentially fit with the wheel via a gear
frame; the clutch block axially engages with the gear
ring under the effect of the return spring.

6. The cam self-adaptive automatic speed shift hub according to claim 5, wherein the low-gear overrunning clutch is a wedge overrunning clutch that includes a wedge, a wedge spring, a left baffle for wedge and a right baffle for wedge;
- an axial extension of the low-gear ring servers as an inner ring of the wedge-type overrunning clutch;
- the wedge is positioned between the left baffle for wedge and the right baffle for wedge via a wedge shaft;
- the wedge spring is sleeved onto the wedge shaft, with one end acting on the wedge and the other end acting on an adjacent wedge in a manner of torsion spring, to have the inner ring and the outer ring of the wedge overrunning clutch to engage with each other.

7. The cam self-adaptive automatic speed shift hub according to claim 6, wherein the speed shift spring is positioned on the left of the axially extending annular member, within a cavity between the internal cooling water tank and the drive shaft;
- the expansion direction of the cam slot, when viewed from left to right, is opposite to the rotation direction of the drive shaft.

8. The cam self-adaptive automatic speed shift hub according to claim 7, wherein the speed shift spring is a belleville spring set;
- an initial stress adjusting ring is positioned between the speed shift spring and the axially extending annular member;
- the cam pin inserts into the cam dot through the cam pin sleeve that is in clearance fit with the earn pin.

9. The cam self-adaptive automatic speed shift hub according to claim 8, wherein the right hub frame is securely connected with the case body through the brake;
- the clutch block axially engages with the gear ring through a clutch gear ring that is securely connected thereto;
- and, the clutch gear ring engages with the gear ring via an end thee spline.

10. The cam self-adaptive automatic speed shift hub according to claim 2, further including a sensing mechanism; the power input device is as sprocket;
- the sensing mechanism includes a sensing mechanism housing secured with respect to the case body, a sprocket driving drum, a sensing cam pin, a sensing shaft, a sensing drum securely connected with the sensing shaft, a sensing spring and a sensing frame; the sprocket is circumferentially sleeved on the sprocket driving drum;
- the sprocket driving drum is sleeved on the axially extending gear ring in clearance fit;
- the sensing drum is in parallel positioned with the axially extending gear ring, and circumferentially engages with the axially extending gear ring in an axially movable manner; the sprocket driving drum is provided with more than one spirally expanded cam through-slots;
- the sensing drum is provided with pin grooves on it periphery, the number of which is equal to that of the cam through-slots; the sensing cam pin inserts the pin groove through the cam through-slot;
- the sensing frame is securely connected with the sprocket driving drum and is in rotation fit with the sensing shaft; the sensing shaft passes through an end cover of the sensing frame;
- the sensing spring has one end secured with respect to the sensing shaft, and the other end abutted against the end cover of the sensing frame; the sensing shaft is provided with a magnetic steel on an end that the sensing shaft passes through the end cover of the sensing frame;
- a Hall sensor is positioned corresponding to the magnetic steel on the sensing mechanism housing.

11. The earn self-adaptive automatic speed shift hub according to claim 10, wherein the speed shift spring is positioned on the right side of the axially extending annular member, within the cavity between the axially extending gear ring and the drive shaft
- the expansion direction of the cam slot, when viewed from left to right, is same as the rotation direction of the drive shaft; the sensing mechanism is positioned on the right end of the drive shaft; the expansion direction of the cam through-slot, when viewed from left to right, is opposite to the rotation direction of the drive shaft;
- the sensing cam pin passes through the cam through-slot via the sensing cam pin sleeve;
- the sensing spring is a belleville spring set.

\* \* \* \* \*